United States Patent [19]

Heimlich

[11] Patent Number: 4,971,229
[45] Date of Patent: Nov. 20, 1990

[54] PISTON ADJUSTING DEVICE FOR FLOWABLE MATERIAL DISPENSER

[75] Inventor: Philip F. Heimlich, Coral Springs, Fla.

[73] Assignee: hiMedics, inc., Hollywood, Fla.

[21] Appl. No.: 400,282

[22] Filed: Aug. 29, 1989

[51] Int. Cl.⁵ .............................................. G01F 11/28
[52] U.S. Cl. ................................... 222/440; 222/162; 222/166; 222/308; 222/444; 222/449
[58] Field of Search ........ 222/162, 166, 282, 305–308, 222/363, 434, 435, 438, 440, 444, 448, 449, 450, 451

[56] References Cited

U.S. PATENT DOCUMENTS

| | | | |
|---|---|---|---|
| 2,740,559 | 4/1956 | Norwood | 222/308 |
| 2,778,528 | 1/1957 | Corcoran | 222/308 X |
| 3,189,233 | 6/1965 | Wilson et al. | 222/440 |
| 3,327,904 | 6/1967 | Goda et al. | 222/440 X |
| 4,151,933 | 5/1979 | Myers | 222/308 X |
| 4,162,751 | 7/1979 | Hetland et al. | 222/305 X |
| 4,579,256 | 4/1986 | Heimlich | 222/162 |
| 4,696,414 | 9/1987 | Huat | 222/306 X |

Primary Examiner—Kevin P. Shaver
Attorney, Agent, or Firm—Hayes & Reinsmith

[57] ABSTRACT

An adjustable dose dispenser having a measuring chamber of constant cross-section defined in a housing wherein an end of the chamber is selectively placed in communication with a reservoir containing flowable material to fill the chamber and with a passage to discharge material from the dispenser, and including a piston movably mounted in the housing and having an end face located in the measuring chamber so as to define the measuring volume between the piston end face and the end of the chamber. A manually operable drive mechanism is movably carried by the housing and has formations thereon operatively engaging formations on the piston so that upon movement of the drive mechanism the piston end face is moved along the measuring chamber to vary the volume thereof and so that dimensional control of the volume of the measuring chamber is determined by tolerance associated with misalignment of the formations on the piston and drive mechanism. The formations preferably are fine pitch gear teeth, and the piston and drive mechanism are installed in the dispenser in a manner such that the total tolerance associated with the volume of the measuring chamber is defined as the circular pitch of the gear tooth, i.e., the maximum misalignment between the gear teeth on the piston and on the drive mechanism.

18 Claims, 5 Drawing Sheets

PISTON ADJUSTING DEVICE FOR FLOWABLE MATERIAL DISPENSER

FIELD OF INVENTION

This invention relates to devices for containing, measuring, and dispensing flowable materials; more particularly, the invention relates to hand-held and hand-operable devices which are provided with means for controlling the accuracy of the measured volume of flowable material dispensed.

Adjustable metered dose dispensers normally use a metering chamber of volume with an adjustment mechanism such as a piston located within the metering chamber as a function of the desired metering volume. An example of such dispenser is discussed in U.S. Pat. No. 4,579,256 issued to P. F. Heimlich. If the metering chamber is of constant cross-section such as in a cylinder, then volume adjustment is obtained by varying cylinder height, i.e. length, by controlling piston location with respect to the one fixed end of the metering volume. The piston location is determined with a locating mechanism such as a screw thread or similar camming device. The accuracy of the volume of material measured in the metering volume is a function of the dimensional controls employed for the cross-sectional area and the location of the end of the piston in relation to the fixed end of the metering chamber.

For metering volumes where characteristic dimensions are very large with respect to the dimensional tolerances, the above approach to metering a volume of flowable material can be done very accurately. However, if the dimensional tolerances comprised of the sums and/or differences of multiple dimensions and clearances between and within parts are significant with respect to a characteristic dimension of the metering volume, such as the length of the metering volume, then substantial inaccuracies in the volume measurement will be inherent in the conceptual configurational approach to the mechanism. For devices so described above which attempt to measure very small volumes utilizing manufacturing methods such as molded plastic for the component parts, significant measurement inaccuracy is inherent.

OBJECTS OF THE INVENTION

It is, therefore, a primary object of the present invention to provide a new and improved device for measuring and dispensing flowable material wherein accuracy of the measured volume of flowable material is precisely controlled.

It is a further object of the present invention to provide such a device having improved means for controlling the accuracy of the measured volume of flowable material dispensers where very accurate control of the volume is required and where dimensional tolerances are signficant with respect to the dimensions within the metering volume.

It is a more particular object of the present invention to provide such a device wherein dimensional control of the metering volume is determined by a simple dimensional tolerance.

It is another object of the present invention to provide such a device having a metering piston movable in a measuring chamber to adjust the volume thereof wherein movement of the piston is effected in a manner which negates axial and/or positional tolerances inherent in the manufacture of parts of the device.

It is still a further object of the present invention to provide such a device having a metering position movable in a measuring chamber which eliminates all axial and circumferential tolerances with the exception of a single well-defined controllable tolerance.

It is yet another object of the present invention to provide such a device which is economical to fabricate, easily operated and adapted to a wide variety of uses for dispensing different materials, e.g., gels, liquids, powders and other types of flowable materials such as granular particles in various forms of dispensers such as a squeeze tube or pump-types unit or a gravity activated device.

SUMMARY OF THE INVENTION

The present invention provides an adjustable dose dispenser having a measuring chamber of constant cross-section defined in a housing wherein an end of the chamber is selectively placed in communication with a reservoir containing flowable material to fill the chamber and with a passage to discharge material from the dispenser and including a piston movably mounted in the housing and having an end face located in the measuring chamber so as to define the measuring volume between the piston end face and the end of the chamber, and wherein there is provided manually operable drive means movably carried by the housing and having formations thereon operatively engaging formations on the piston so that upon movement of the drive means the piston end face is moved along the measuring chamber to vary the volume thereof and so that dimensional control of the volume of the measuring chamber is determined by tolerance associated with misalignment of the formations on the piston and drive means. The formations preferably comprise fine pitch gear teeth, and the piston and drive means are installed in the dispenser in a manner such that the total tolerance associated with the volume of the measuring chamber is defined as the circular pitch of the gear tooth, i.e., the maximum misalignment between the gear teeth on the piston and on the drive means.

A better understanding of the objects, advantages, features, properties, and relations of the invention will be obtained from the following detailed description and accompanying drawings which set forth a certain illustrative embodiment which is indicative of the various ways in which the principles of the invention are employed.

DETAILED DESCRIPTION OF THE PREFERRED EMBODIMENT

Directional terms are used herein, but it is to be understood that such terminology is employed for convenience of description and is not to be regarded in any way as limiting the invention.

Referring to the drawings in greater detail wherein like reference numerals indicate like parts within the figures, a preferred embodiment of th device 10 comprises a minimum number of parts assembled into an integrated unit of a size to be readily grasped and held in one hand. The parts preferably are of plastic material to afford lightweight and economical construction.

Figure 1:
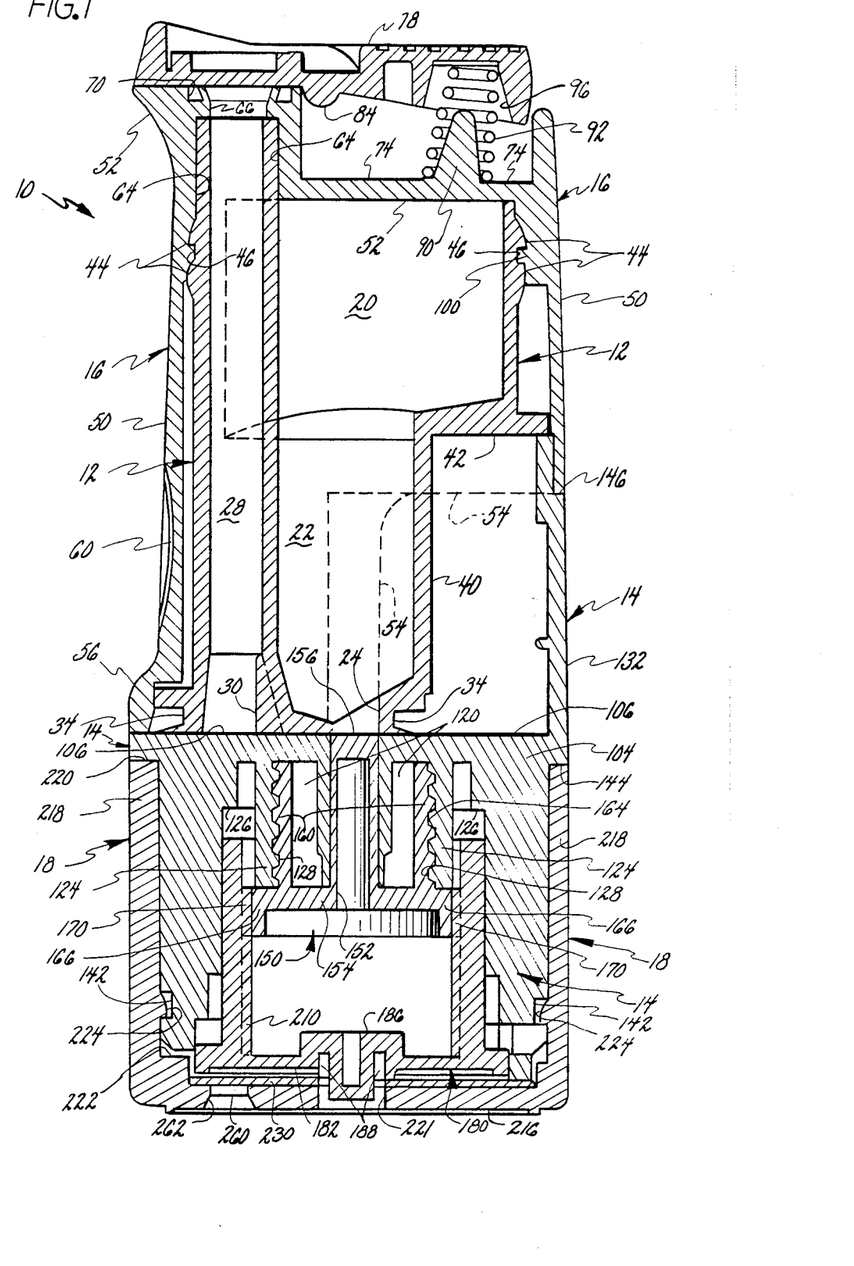
FIG. 1 is a longitudinal sectional view of a preferred embodiment with the piston thereof in an initial assembled position defining zero measuring chamber volume.
Figure 2:
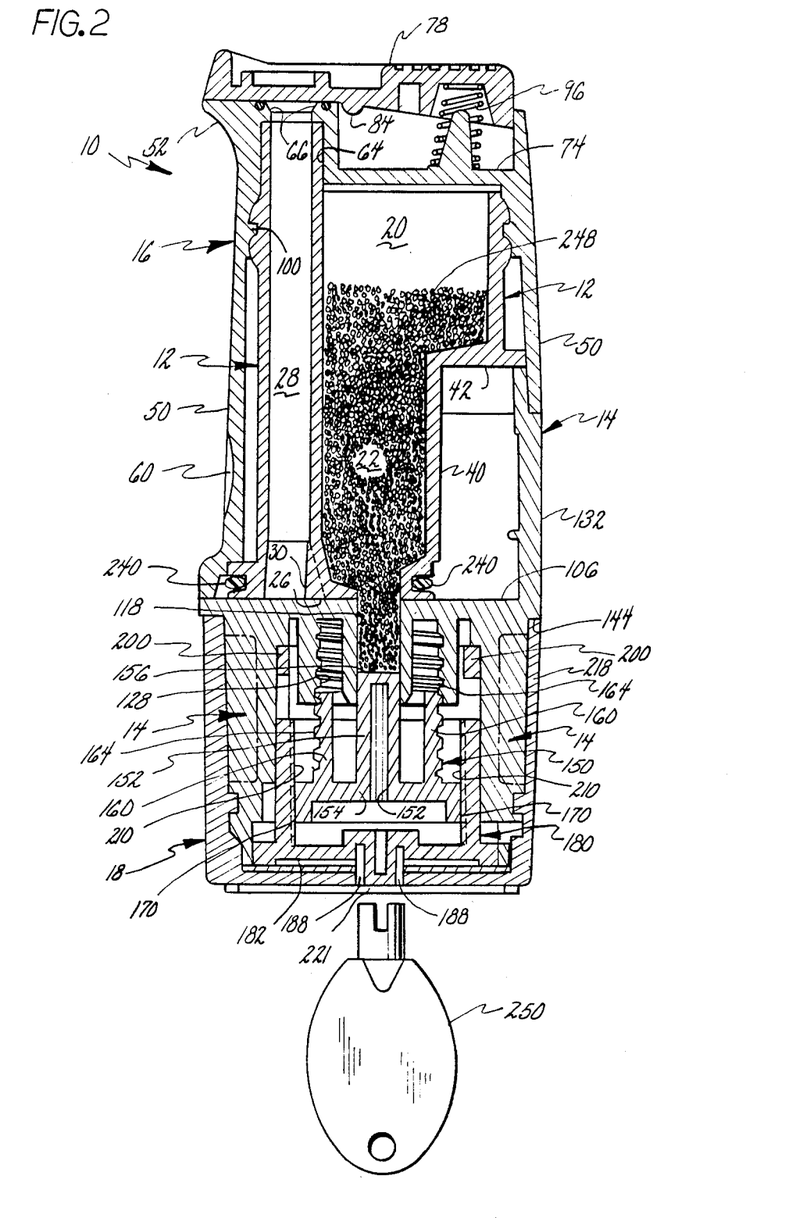
FIG. 2 is a view similar to FIG. 1 showing the piston adjusted to define a selected measuring chamber volume and illustrating the device in a first non-discharging position.
Figure 3:
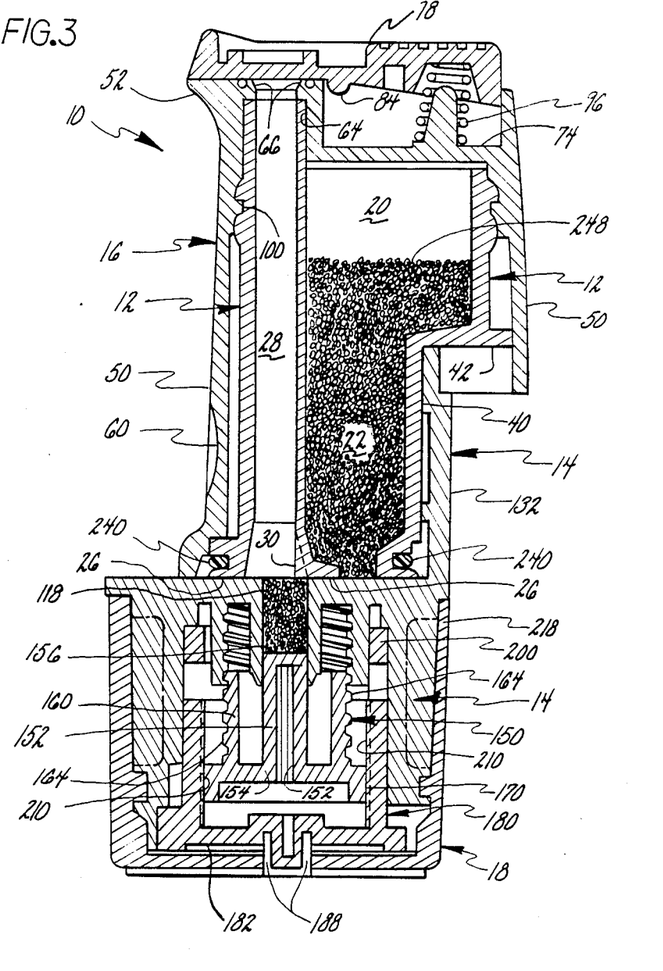
FIG. 3 is a view similar to FIG. 1 showing the device in a second position wherein the vessel is moved to place the measuring chamber in communication with the discharge passage prior to inversion of the device.

As seen in FIG. 1, where the apparatus is in the upright or measuring position, device 10 is provided with a vessel or chamber 12 movably connected to a housing 14. Vessel 12 is positioned within an upper cap 16 and housing 14 is closed at the lower end, as viewed in FIG. 1, by a bottom cap 18. Vessel 12 is formed to include a reservoir 20 in the upper region thereof as viewed in FIG. 1 for holding a quantity of flowable material. In the specifically illustrated embodiment, a first passage 22 is shown leading from reservoir 20 to a fill opening 24 in a lower end wall 26 of vessel 12, and a second passage 28 leading from a discharge opening 30 in the wall 26 to the upper end of vessel 12 as viewed in FIG. 1. Vessel 12 is provided with an annular groove 34 adjacent end wall 26 to receive an O-ring 38 as shown in FIGS. 2 and 3, and vessel 12 has a sidewall portion 40 and an intermediate wall portion 42 which meet at substantially right angles and cooperate with surfaces of housing 14 during movement of vessel 12 between measuring and discharge positions. Vessel 12 also is provided with an annular bead-like enlargement 44 around the outer surface thereof and including an annular groove 46 for connection to the upper cap 16 in a manner which will be described.

Figure 4:
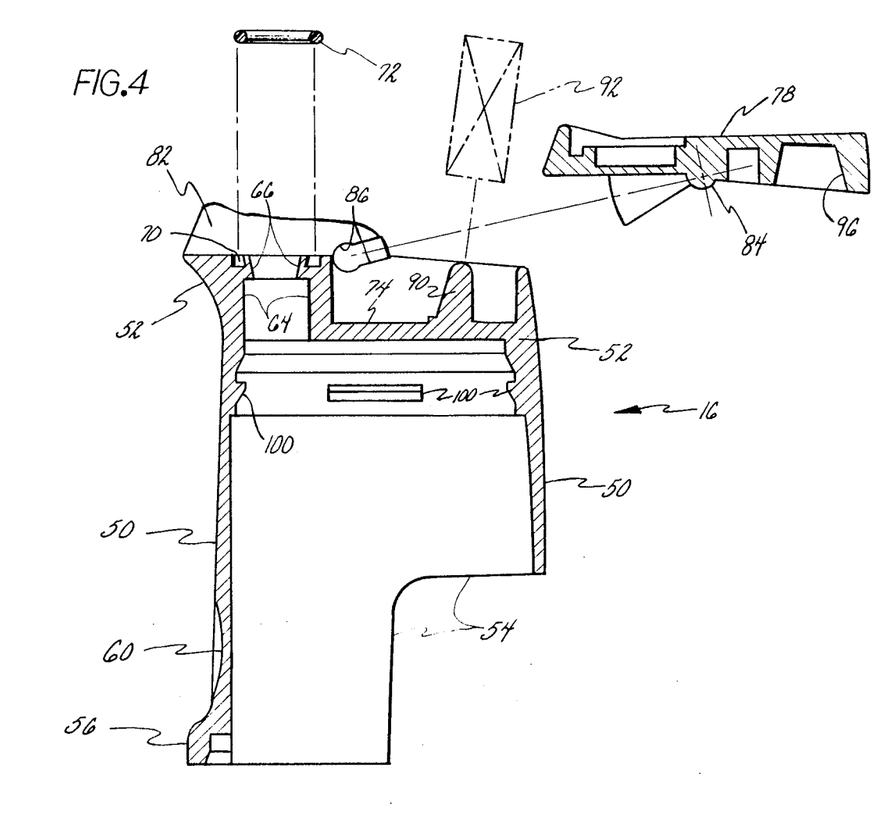
FIG. 4 is a developed view illustrating the upper end and exit spout lid of the device of FIG. 1.

Upper cap 16 is generally cylindrical in shape having a sidewall portion 50, an end wall portion 52 at the upper end thereof as viewed in FIG. 1, and an open end opposite lower open end. As shown in FIG. 4, sidewall 50 is provided with an opening 54 extending around about half the circumference thereof and along about half the axial length thereof to receive an upper portion of housing 14 to accommodate movement of vessel 12 which will be described. To accommodate the portion of the vessel 12 defining annular groove 34, the lower end of the sidewall 50 of upper cap 16 is provided with an annular radially extending skirt 56. A recess 60 is provided in the outer surface of sidewall 50 to defined a finger grip which facilitates manipulation of device 10 as will be described. The upper end wall 52 includes a cylindrical passage 64 extending from the inner surface of wall 52 to receive the upper end of vessel 12 defining the reservoir passage 28, and passage 64 communicates with a smaller diameter outlet opening 66. An annular groove 70 provided in the outer surface of wall 52 concentric with opening 66 receives an O-ring seal 72 as shown in FIG. 4. To accommodate pivotal movement of a lid 78 between positions closing and opening the outlet 66, the outer surface of end wall 52 also is provided with a recess 74. The portion of lid 78 operatively associated with outlet 66 is movably received in a channel defined between a pair of external guide projections in end wall 52, one of which is designated 82 in FIG. 4. Lid 78 has a laterally extending shaft-like formation 84 located about midway along the length thereof which is pivotally received in socket-like recesses in end wall 52, one of which is designated as 86 in FIG. 4. The inner surface of end wall recess 74 is provided with a conical formation 90 on which is fitted one end of a coil spring 92, the other end of which is seated in a recess 96 of lid 78. As a result, in this specific embodiment, lid 78 is biased toward a closed position covering outlet 66 and is pivoted to an open position uncovering outlet 66 by manual force applied to the right-hand end thereof as viewed in FIG. 1. When upper cap 16 is fitted onto vessel 12, a plurality of circumferentially spaced internal ribs 100 on cap 16 snap fit into the annular groove 46 formed on the outer wall surface of vessel 12.

Figure 5:
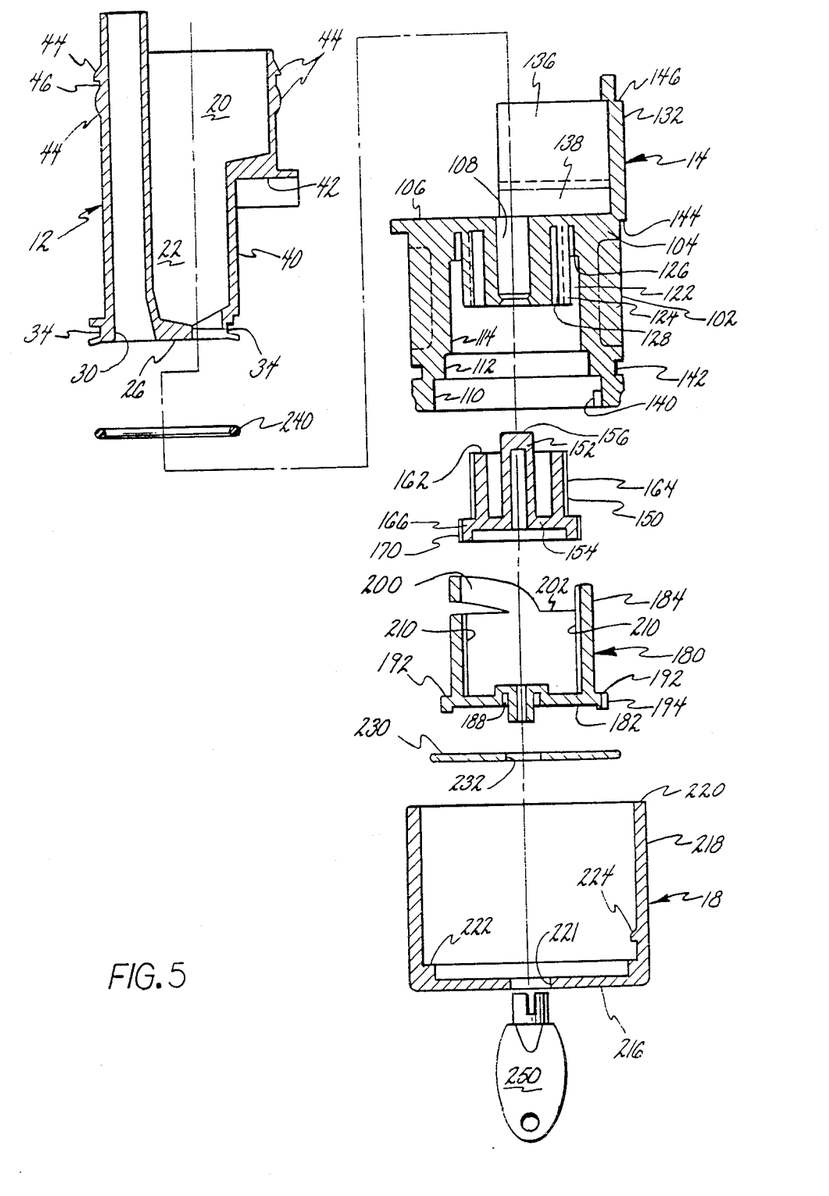
FIG. 5 is a developed view illustrating the assembly of components of the device of FIG. 1.

Housing 14 includes an annular main body portion having an annular sidewall 102 extending from an upper end wall 104 (as viewed in FIG. 1) which wall 104 has a planar outer end face 106. The end of housing 14 which is opposite wall 104 is open, and the interior of the housing body portion includes concentric sections 110, 112 and 114 respectively of decreasing inner diameter with section 114 having the longest axial length as shown in FIG. 5. The body of housing 14 is provided with a central through bore or passage 118 open at one end to interior section 114 and open at the other end to end face 106. The dispenser measuring chamber is defined in passage 118 in a manner which will be described.

A first annular recess or chamber 120 is provided in the body of housing 14 concentric with passage 118 and terminating axially inwardly of end face 106. A second annular recess or chamber 122 is provided in the body concentric with recess 120 and terminating axially inwardly of end face 106 thereby defining an annualar wall 124 between recesses 120 and 122. Recess 122 is formed to include an annular shoulder 126 therein, and wall 124 is provided with internal threads 128 along the inner surface thereof for purposes to be described.

To provide guide contact engagement for vessel 12 and upper cap 16, housing 14 also includes a vessel-guiding extension including an arcuate side wall portion 132 extending along a portion of the circumference of end face 106 and an arrangement of four spaced-apart substantially mutually parallel guide walls extending from wall portion 132, two of which are designated 136 and 138 in FIG. 5. The guide walls terminate at locations near the center of end face 106 and the top edges thereof (as viewed in FIG. 5) provide additional guide surfaces which contact surfaces of vessel 12 and upper cap 16. There is also provided a detent 140 on the inner surface of section 110 adjacent the open end of housing 14, an annular groove 142 in the outer surface of sidewall 102 near the open end of housing 14, an outer annular shoulder 144 adjacent end wall 104, and an arcuate shoulder 146 near the upper end of wall 132 as viewed in FIGS. 1 and 5, all for the purposes of assembling housing 14 with other components of the dispenser as will be described.

To vary the quantity of the flowable material receivable in the measuring chamber, dispenser 10 further comprises a metering member or piston generally designated 150 which is adjustably positioned in the metering chamber. Piston 150 is formed to include a central hollow cylindrical portion 152 extending from a generally disc-shaped end wall 154 and terminating at the other axial end thereof in a smooth, flat piston end face 156. There is provided an outer annular wall 160 extending axially from end wall 154 concentric with central portion 152 and terminating in an end face 162 located axially inwardly of piston end face 156. An annular recess thus is defined between central portion 152 and wall 160, and the outer surface of wall 160 is provided with threads 164 for a purpose to be described. End wall 154 is bounded by a circumferential annular skirt 166 located radially outwardly of annular wall 160. In accordance with the present invention, piston 150 is provided with formations 170 thereon, in particular external gear teeth or spline along the outer circumferential surface of skirt 166, for a purpose to be described.

The dispenser according to the present invention further comprises manually operable drive means or dose barrel, generally designated 180, carried by housing 14 and operatively engaging piston 150 so that upon movement of drive means 180, piston 150 is moved within passage 118 to vary the volume of the measuring chamber. In addition, dimensional control of the volume of the measuring chamber is determined by the tolerance associated with the operative engagement between drive means 180 and piston 150 in a manner which will be described in detail presently. The drive means or dose barrel 180 is generally cup-shaped having a circular end wall 182 and a cylindrical side wall 184 extending therefrom and defining an open end which is opposite wall 182. End wall 182 has a generally central hub 186 which extends axially outwardly thereof and is adjacent a plurality of circumferentially spaced recesses 188 which define a key-way for effecting movement of drive means 180 in a manner which will be described. To facilitate alignment of dose barrel 180 during assembly of dispenser 10, end wall 182 terminates in an annular skirt 192 located radially outwardly of side wall 184 and which is provided with a detent notch 194. The end of side wall 184 axially opposite wall 182 is formed to include at least one axially extending flange 200 which serves as a spring mounting for dose barrel 180 in housing 14 as will be described. Flange 200 is integral with side wall 184 and has an inner end extending from an annular end face 202 of wall 184. In addition, flange 200 has an arcuate body axially offset from wall end face 202 and having the same degree of curvature as the adjacent portion of wall 184, and terminates in an end face disposed parallel to the longitudinal axis of dose barrel 180. As a result, flange 200 is flexible toward and away from end face 202.

While it is contemplated that different piston locating devices may be used as drive means such as a camming device, the preferred embodiment illustrates a dose barrel 180 provided with formations 210 thereon, in particular, internal gear teeth or splines along and around the inner surface of annular side wall 184, for operative engagement with formations 170 on piston 150 in a manner which will be described in detail presently.

Bottom cap 18 is generally cylindrical in shape having a circular end wall 216 and an annular side wall 218 extending therefrom and terminating in an axial end face 220. End wall 216 is provided with a central opening 221 to allow access to the key-way of dose barrel 180 in the assembled dispenser. An internal annular shoulder 222 is provided along the junction between end wall 216 and side wall 218. At least one projection or nub 224 is provided on the inner surface of wall 218 which snap fits into housing annular groove 142 during assembly of the dispenser. There is also provided a disc-shaped spacer 230 which seats against the inner surface of end wall 216 within annular shoulder 222 and has a central opening 232 to allow access to the key-way of dose barrel 180.

Assembly of dispenser 10 is accomplished in the following manner. A subassembly of the upper cap 16 is provided by fitting O-ring 72 in groove 70, spring 92 being seated on conical formation 90, and lid 78 being assembled on upper cap 16 by fitting shaft formations 84 in sockets 96 as previously described and by inserting the outer end of spring 92 in recess 96. As a result, lid 78 is biased toward a normally closed position for covering outlet 66 as shown in FIG. 1.

An O-ring seal 240 is fitted in vessel annular groove 34. The assembly of vessel 12 and O-ring 240 is combined with housing 14 by inserting the lower right hand portion of vessel 12 including sidewall portion 40 into the arrangement of housing guidewalls 136, 138, and by placing the outer surface of vessel end wall 26 in contact with housing end face 106 and the annular end face of skirt 56 in contact with the periphery of end face 106. Accordingly the portion of vessel 12 fits in a snug but slidably moveable manner in the arrangement of housing guidewalls, and a suitable arrangement of cooperating guide track formations (not shown) can be provided at appropriate locations on vessel 12 and housing 14 to permit limited lateral movement of vessel 12 on housing 14 and to prevent undesired relative axial movement. Piston 150 is installed by aligning the end of central portion 152 with the housing passage 118, engaging the external piston threads 164 with the internal threads 128 on housing wall 124 and rotating piston 150 with an appropriate tool until it is advanced to the desired position. Typically, that is the position shown in FIG. 1 where piston end face 156 is co-planar with housing end face 106. In this connection, a portion of the outer surface of vessel end wall 26 extends across a portion of the opening of passage 118 which serves as a stop for contacting the piston end face 156 during such assembly. Upon the vessel 12 being filled with material 248, the above described upper cap subassembly then is snap-fitted onto vessel 12 with the internal ribs 100 on cap 16 snap-fitted in vessel groove 46 as previously described.

In accordance with the present invention, piston 150 is threaded into housing 14 to the foregoing predetermined initial position in a manner minimizing the slip torque when that position is reached which will be described in detail presently. Next, dose barrel 180 is installed by inserting the side wall 184 thereof into housing annular recess 122 with the spring flange 200 contacting the internal shoulder 126 of housing 14, and with the dose barrel detent notch 194 aligned with housing detent 140 which insures that the external piston gear teeth 170 are in proper meshing engagement with the internal dose barrel gear teeth 210. While dose barrel 180 is held in place against the axial spring action provided by flange 200, bottom cap 18 with spacer 230 seated therein is snap-fitted over the open end of housing 14 to complete the assembly, this being provided by engagement between bottom cap nub 224 and housing annular groove 142.

Operation of dispenser 10 is effected in the following manner. A quantity of flowable material 248 which can be in various forms such as powder or granular solids, liquid or gel is stored in reservoir 20 and passage 22 of vessel 12. A desired setting for dispensing an equivalent amount of flowable material is set by inserting a key 250 through opening 221 in bottom cap 18 and into engagement with dose barrel slots 188 and then turning key 250 to rotate dose barrel 180. The engagement between internal gear teeth 210 within dose barrel 180 and external gear teeth 170 on piston 150 converts rotation of dose barrel 180 into longitudinal movement of piston 150 within housing 14 by virtue of the engagement between piston threads 164 and housing threads 128. FIG. 2 illustrates movement of piston 150 by the foregoing procedure to a desired position where the measuring chamber volume is the volume of passage 118 between piston end face 156 and the level of the outer surface of vessel end wall 26.

The degree of rotation of key 250 to obtain a desired measuring chamber volume can be determined in various ways. For example, appropriate indica can be provided around the peirphery of the outer surface of dose barrel end wall 182. Visual access to the indicia can be provided by forming spacer 230 of transparent material and by providing a viewing window 260 in a recess 262 in the end wall 216 of bottom cap 18 as shown in FIG. 1.

In the specifically illustrated embodiment, after the desired setting is obtained, the operator positions dispenser 10 in the upright position as shown in FIG. 2 to accurately premeasure a specific quantity of material. As the dispenser 10 is then in the first, fill position, the material contained in reservoir 20 flows through the first passageway 22 into the measuring chamber defined in passage 118 between piston end face 156 and the level of the outer surface of vessel end wall 26. Dispenser 10 is grasped in one hand about housing 14 with the index finger contacting grip 60 whereupon squeezing or compressing the device in the hand laterally shifts the combination of vessel 12 and upper cap 16 to the position illustrated in FIG. 3. Lateral movement is guided by housing wall portions 136, 138 as previously described, and the extent of movement in the foregoing direction is determined or controlled by engagement between vessel wall portion 40 and housing sidewall 132. When the position of FIG. 3 is reached, the first passageway 22 is out of registry with the measuring chamber, and the second or discharge passageway 28 is in registry with the measuring chamber through discharge opening 30. Upon inversion of dispenser 10 and pivoting of lid 78 to the opened position, the measured amount of flowable material in the measuring chamber is discharged through passageway 28 and out through outlet opening 66. Dispenser 10 then can be returned to the upright position and manipulated to return vessel 12 and cap 16 laterally to the position of FIG. 2 whereupon material flows from reservoir 20 into the measuring chamber to provide another measured quantity of material for subsequent dispensing. The foregoing operation of dispenser 10 wherein vessel 12 is shifted laterally between a material measuring position and a material discharging position upon inversion is similar to that of the dispenser described in the afore-mentioned U.S. Pat. No. 4,579,256 issued Apr. 1, 1986, the disclosure of which is hereby incorporated by reference. It is to be understood that the fully described piston adjusting device is equally useful in other types of dispenser, however, which may not require inversion but rather may be positive displacement mechanisms such as known squeeze tube devices, pressurized or spring actuated pump devices and the like for dispensing solids, liquids or gels.

In dispenser 10 as previously described, the volume of the measuring chamber is defined as the cylindrical volume of housing passage 118 between the underside vessel 12, i.e., outer surface of vessel end wall 26, and the top of piston 150, i.e. piston end face 156. When the illustrated dispenser 10 is operated by squeezing the parts together as previously described, vessel 12 is translated from the fill to the pour position. In the process of this movement, the flowable material is skimmed off by the underside of vessel 12. The underside of vessel 12 is therefore considered the top of the metering chamber. The bottom of the metering chamber is by definition the top of piston 156. The dimensional control of the metering volume diameter is defined by the tolerance associated with a single molded dimension and, therefore, is precisely and accurately controlled. In other words, the control of the metering diameter is important in that it defines the cross sectional area of the cylindrical metering volume. Since the cross section area of a circle is defined as a function of the square of the diameter, then the variation in the metering volume as a function of the diameter, is the ratio of the square of the extremes of the diameter. For example, a diameter of 0.250±0.002 inch has a variation of $$\pm \left[ \frac{(.252)}{(.250)} \right]^2 = \pm 1.016$$

or = ±1.6% so that a tolerance of ±0.002 on a 0.250 inch diameter results in a variation of metering volume of ±1.6%.

Minimizing dimensional tolerances associated with the length of the metering cylindrical volume is of primary concern and is squarely addressed by this invention. Upon assembly, piston 150 is screwed onto housing 14 by engagement with the threads 164 and 128 between the piston 150 and housing 14, respectively, until end 156 of piston 150 which defines the bottom of the metering volume comes in contact with the bottom of vessel 12 which overhangs passage 118 slightly. The bottom of vessel 12 defines the top of the metering volume. The piston 150 is considered bottomed on the underside of the vessel 12 when upon insertion the slip torque of the insertion assembly tool is reached.

In particular, the method by which piston 150 is bottomed on the underside of vessel 12 is important. The pre-load on piston 150 from the bottoming load pressure results in a compression of the piston shaft 152. If this load is not controlled to an acceptably low value, then dosage inaccuracy will result. When the dosage is set by moving piston 150 away from the initial position shown in FIG. 1, the piston compressive bottoming load is relieved allowing piston 150 to expand to its uncompressed position. The amount of compression and its control adds inaccuracy in height location. The installation tool employed is a slipping torque wrench to rotate the piston 150 and will slip when the tool torque reaches a value sufficient enough to allow bottoming of piston 150 on the vessel 12 which, in an illustrative dispenser is approximately 12 inch oz. The slip torque is defined as the sum of the running torque and the bottoming torque. It is desirable to keep the bottoming torque at or below 6 inch oz. in the foregoing illustration to minimize the compression of piston 150. In production, the slip torque can be empirically derived from statistical data once the running torque of piston 150 in housing 14 is determined. The assembly tool will be so configured as to concentrically align piston 150 relative to housing 14 prior to its rotating piston 150 for meshing of the piston threads into those of the housing.

The extreme outside or periphery of piston 150 contains a gear form 170, a spline, which contains many gear teeth around the circumference of the gear. By way of example, in an illustrative device wherein the outer diameter of piston annular skirt 166 is 0.800 inch, there are 61 male spline teeth. After assembly of piston 150, the dose barrel 180 is installed as previously described. The dose barrel 180 contains 61 female spline teeth which slidably engage the 61 male spline teeth of piston 150. The leading edges of the spline teeth of both the piston 150 and the dose barrel 180 are chamfered, for example at about 30°, to permit self engagement upon insertion. The angular location of the dose barrel 180 upon insertion is controlled by the alignment of the zero installation notch 194 in the dose barrel with the detent nub 140 affixed to the housing 14.

With the dose barrel 180 and piston 150 being assembled at the zero detent measurement position, the configuration allows for misalignment of the piston 150 via a fine pitch gear drive mechanism. The misalignment is accounted for with beveled lead-in surfaces of the gear teeth on both the piston 150 and dose barrel 180. The configuration for the alignment is similar to the self-aligning gear teeth in an automatic transmission of an automobile. The beveled lead-in surfaces of the dose barrel 180 contact the lead-in surface of the piston 150 and rotate the piston up to a maximum of half of the circular pitch until alignment and then engagement is reached. Involute splines are preferred for the gear teeth because they are standard and easily manufactured, provide for a very low contact angle and are a strong tooth configuration.

Since the clearances between the male and female splines of the piston 150 and dose barrel 180 and the clearances between the notch 194 of dose barrel 180 and detent nub 140 of the housing 14 are small, then the only significant tolerance associated with the metering volume length is the misalignment of the spline teeth. The total tolerance associated with the height of the metering chamber is the circular tooth pitch of the gear tooth. It is the maximum misalignment between the piston 150 and the dose barrel 180. The circular tooth pitch is the circumferential distance at the pitch diameter between the teeth. Preferably, the pitch of the screw thread between piston 150 and housing 14 is 0.49125 inches (0.500 inches minus mold shrinkage). Upon assembly the maximum amount of misalignment is by definition ±half of a circular pitch. The resulting axial alilgnment tolerance is ±1/122 of the axial pitch of the screw thread or ±0.004 inches. By comparison, if the location of the top of the piston 150 relative to the bottom of the vessel 12 was controlled by location tolerances alone, then the sum and/or difference of the combined axial and angular tolerances would be at least ±0.018 inches. In other words, ±0.018 inch tolerance would result if the method employed did not permit the zeroing of the piston 150 on assembly since a minimum of eight or nine dimensions is required to determine the position of the end of the piston relative to the bottom of the vessel 12. By zeroing of piston 150 is meant setting of the piston at zero volume height relative to the bottom of vessel 12 at assembly. The zeroing of the piston 150 relative to the bottom of the vessel 12 eliminates all axial and circumferential tolerances with the exception of the spline misalignment. In other words, the zeroing eliminates the axial and circumferential tolerances and only adds in the tolerances associated with the misalignment of the spline gear teeth.

Thus, the location of metering piston 150 is set at assembly by installing it to a maximum slip torque at zero height or any other height, and the driving mechanism, i.e. dose barrel 180, drives the metering piston through a multi-toothed gear or spline inerface 170, 210 which negates the axial and/or positional location tolerances inherent in the manufacture of the path of dispenser 10. In this connection, it is to be noted that piston 150 does not necesssarily have to be bottomed at the zero position. That is, there could be a pre-charge either located in the piston or the piston could be bottomed in the metering chamber a predetermined distance away from the bottom of vessel 12.

In another aspect of the invention, after assembly the completed dispenser is heat soaked at a sufficient enough temperature to alleviate or reduce the stresses implied to the parts as a result of the preload incurred from the torquing of the piston 150 on assembly and any readjustment from the dose barrel gear tooth mechanism. In particular, as previously described, the piston 150 may be zeroed on the underside of the vessel 12 to a predetermined slip torque, putting the piston in a state of compressive stress. This results in a potential inaccuracy due to the fact that when the dosage is set and the piston 150 is moved off the bottom of the vessl, the piston will grow in length as a result of the relief of the compressive stress. These parts are made from injection molded thermoplastics. It is possible to heat set (stress relieve) the piston 150 by heat soaking the dispenser 10 at an elevated temperature. By so doing, the stress in the piston could be completely relieved and the inaccuracy associated with the compressive stress on the piston shaft would be eliminated. Tests have shown that heat soaking does improve the accuracy of the dispenser 10. If it would be possible to completely stress relieve the piston 150 with the piston always remaining in contact with the vessel 12, then there would be no tolerance associated with the location of the piston in the metering chamber.

As will be apparent to persons skilled in the art, various modifications, adaptations and variations of the foregoing specific disclosure can be made without departing from the teachings of this invention.

I claim:

1. A hand-held and hand-operable device for measuring and dispensing a flowable material and comprising:
   a. a housing having a measuring chamber of cylindrical cross section for accepting and measuring a quantity of said flowable material;
   b. a piston adjustably positioned within said measuring chamber by threads to vary the quantity of said flowable material receivable in said measuring chamber;
   c. gear teeth on said piston extending along a circular path concentric with a longitudinal axis of said piston; and
   d. manually operable drive means rotatably mounted in said housing concentric with said piston and having gear teeth along a circular path on the inner surface thereof and operatively engaging said piston gear teeth so that, upon movement of said drive means, said piston is moved within said measuring chamber to vary the volume thereof, the accuracy of the volume of said measuring chamber being determined by misalignment between said drive means and said piston gear teeth.

2. The device of claim 1, wherein said gear teeth on said piston and on said drive means comprise spline teeth each having leading edges which are chamfered to permit self engagement upon insertion.

3. The device of claim 1, further including a zero installation detent notch in one of said drive means and said housing members and a detent nub on the other of said drive means and said housing members, said detent notch and said detent nub when engaged serving to control the angular location of said drive means.

4. The device of claim 1, wherein said housing, said vessel, said metering member and said drive means are of plastic material, and wherein said device is heat treated after assembly to relieve stresses therein.

5. The device of claim 1, further including a vessel having a reservoir for containing said flowable material movably supported on said housing for manual movement between a first measuring position and a second discharging position, said vessel having a first passageway enabling a quantity of said flowable material to fill said measuring chamber when said vessel is in said first measuring position and having a second passageway enabling said quantity of flowable material to discharge from said measuring chamber when said vessel is moved to said second discharging position.

6. In an adjustable measured dose dispenser wherein a measuring chamber of constant cross-section is defined in a housing and an end of said chamber is selectively placed in communication with a reservoir containing flowable material to fill said chamber and with a passage to discharge material from said dispenser;
  a. a piston having an end face located in said measuring chamber so as to define a measuring chamber volume between said piston end face and said end of said measuring chamber;
  b. thread means on said housing;
  c. thread means on said piston operatively engaged with said thread means on said housing for movably mounting said piston in said housing to allow variation in the distance between said piston end face and the end of said measuring chamber;
  d. said piston having a multi-tooth gear form extending along a path thereon; and
  e. manually operable drive means movably carried by said housing and having a multi-tooth gear form extending along a path on said drive means and operatively engaging said piston gear form so that, upon movement of said drive means, said piston end face is moved along said measuring chamber to vary said measuring chamber volume, the accuracy of said volume of said measuring chamber being determined by misalignment of said gear forms on said piston and said drive means.

7. A hand-held and hand-operable device for measuring and dispensing a flowable material and comprising:
  a. a housing having a measuring chamber for accepting and measuring a quantity of said flowable material;
  b. a metering member mounted for movement on said housing;
  c. driving means interconnecting said metering member and said housing for adjustably positioning said metering member within said measuring chamber to vary the quantity of said flowable material receivable in said measuring chamber; and
  d. manually operable drive means mounted on said housing for moving said metering member, said drive means and said metering member having metering member locating means interengaging said drive means and said metering member, said metering member locating means providing driving engagement between said drive means and said metering member so that, upon movement of said drive means, said metering member is moved relative to said drive means and to said housing within said measuring chamber to vary the volume thereof, the accuracy of said volume of said measuring chamber being determined by misalignment between said drive means and said metering member.

8. A hand-held and hand-operable device for measuring and dispensing a flowable material and comprising:
  a. a housing having a measuring chamber for accepting and measuring a quantity of said flowable material;
  b. a metering member adjustably positioned within said measuring chamber to vary the quantity of said flowable material receivable in said measuring chamber;
  c. thread means on said housing;
  d. thread means on said metering member operatively engaging said thread means on said housing for adjustable positioning said metering member within said measuring chamber.
  e. a formation on said metering member; and
  f. manually operable drive means movably carried by said housing and having a formation on said drive means operatively engaging said metering member formation so that, upon movement of said drive means, said metering member is moved within said measuring chamber to vary the volume thereof, the accuracy of the volume of said measuring chamber being determined by misalignment between said drive means and said metering member formations.

9. The device of claim 8, wherein said formations comprise gear teeth on said metering member and gear teeth on said drive means.

10. In an adjustable measured dose dispenser wherein a measuring chamber of constant cross-section is defined in a housing and an end of said chamber is selectively placed in communication with a reservoir containing flowable material to fill said chamber and with a passage to discharge material from said dispenser;
  a. a piston having an end face located in said measuring chamber so as to define a measuring chamber volume between said piston end face and said end of said measuring chamber;
  b. means for movably mounting said piston in said housing to allow variation in the distance between said piston end face and the end of said measuring chamber;
  c. said piston having a multi-tooth gear form extending along a circular path concentric with the longitudinal axis of said piston; and
  d. manually operable drive means rotatably mounted in said housing concentric with said piston and having a multi-tooth gear form extending along a circular path on said drive means and operatively engaging said piston gear form so that, upon movement of said drive means, said piston end face is moved along said measuring chamber to vary said measuring chamber volume, the accuracy of said volume of said measuring chamber being determined by misalignment of said gear forms on said piston and said drive means.

11. The device of claim 10, wherein said gear forms on said piston and said drive means comprise spline teeth each having leading edges which are chamfered to permit self engagement upon insertion.

12. The device of claim 10, further including a zero installation detent notch in said drive means and a detent nub on said housing, said detent notch and said detent nub when engaged serving to control the angular location of said drive means.

13. The device of claim 10, wherein said housing, said reservoir, said piston, and said drive means are of plastic material and wherein said device is heat treated after assembly to relieve stresses therein.

14. A method of making a hand-held and hand-operable dispenser for flowable materials which has a measuring chamber and comprising the steps of:
   a. providing a housing having a measuring chamber open at one end and located generally centrally of the housing, an internal annular threaded wall outwardly of the chamber, and an annular chamber outwardly of the annular wall;
   b. providing a piston having an end face, threads along a path on one surface portion of the piston and gear teeth along a path on another surface portion of the piston;
   c. installing the piston in the housing by engaging the piston threads with the threaded wall of the housing and threading the piston into the housing to a predeterminded initial position said predetermined position corresponding to a maximum torque level achieved while threading said piston onto said housing;
   d. providing a piston drive means in the form of an annular member having gear teeth along a path on a surface portion of the member; and
   e. installing the piston drive means in the housing by inserting the drive means in the annular chamber and engaging the gear teeth of the drive means with the gear teeth of the piston.

15. The method according to claim 14, further including the steps of providing the dispenser components of plastic material and heat treating the components after assembly to relieve stresses therein.

16. The method according to claim 14, further including forming a detent notch in one of the drive means and housing members, forming a detent nub on the other of the drive means and housing members, and wherein the installing step includes aligning the housing detent nub with the drive means guide detent notch.

17. The method according to claim 14, further including the steps of:
   a. providing a vessel having a reservoir for containing the flowable material, a first passageway leading from the reservoir to one end of the vessel, and a second passageway leading from the end of the vessel to another end of the vessel;
   b. assembling the vessel and the housing together so that the first passageway enables a quantity of the flowable material to fill the measuring chamber when the vessel is in one position and the second passageway enables the quantity of flowable material to discharge from the measuring chamber when the vessel is moved to another position and the dispenser is inverted.

18. The method according to claim 17, further including the steps of providing a surface portion on the vessel to extend partly into the open end of the measuring chamber, locating the piston end face in the measuring chamber, and threading the piston into the housing to said initial position wherein the piston end face bottoms against the vessel surface and said torque has a magnitude sufficient to allow bottoming of the piston.

* * * * *